US009466037B2

(12) United States Patent
Reed et al.

(10) Patent No.: US 9,466,037 B2
(45) Date of Patent: Oct. 11, 2016

(54) VERSIONING AND EFFECTIVITY DATES FOR ORCHESTRATION BUSINESS PROCESS DESIGN

(75) Inventors: Lynn Leah Reed, Newburyport, MA (US); Muhammad Zeeshan Butt, Foster City, CA (US); Shrikant Nene, Fairfield, CT (US); Alok Singh, Fremont, CA (US); Krishna Raju Venkata Addala, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 401 days.

(21) Appl. No.: 12/617,697

(22) Filed: Nov. 12, 2009

(65) Prior Publication Data

US 2010/0122258 A1    May 13, 2010

Related U.S. Application Data

(60) Provisional application No. 61/114,276, filed on Nov. 13, 2008.

(51) Int. Cl.
| | |
|---|---|
| G06Q 10/06 | (2012.01) |
| G06F 9/44 | (2006.01) |
| G06Q 10/10 | (2012.01) |
| G06Q 30/04 | (2012.01) |
| G06Q 30/06 | (2012.01) |

(52) U.S. Cl.
CPC .............. *G06Q 10/063* (2013.01); *G06F 8/71* (2013.01); *G06Q 10/06* (2013.01); *G06Q 10/103* (2013.01); *G06Q 30/04* (2013.01); *G06Q 30/06* (2013.01)

(58) Field of Classification Search
CPC .. G06Q 10/06; G06Q 10/063; G06Q 10/103; G06F 8/71
USPC .......................................................... 705/1.1
See application file for complete search history.

(56) References Cited

U.S. PATENT DOCUMENTS

| | | | | |
|---|---|---|---|---|
| 5,872,973 | A * | 2/1999 | Mitchell et al. ............... | 719/332 |
| 6,574,609 | B1 * | 6/2003 | Downs et al. ................... | 705/50 |
| 7,493,499 | B1 * | 2/2009 | Deaver et al. ................. | 713/193 |
| 7,711,647 | B2 * | 5/2010 | Gunaseelan et al. ........... | 705/59 |
| 7,908,318 | B2 * | 3/2011 | Cameron ....................... | 709/203 |

(Continued)

OTHER PUBLICATIONS

"Oracle Communications Order and Serivce Management Version 6.3" Administration guide First Edt. Sep. 2007.*

(Continued)

*Primary Examiner* — Traci Casler
(74) *Attorney, Agent, or Firm* — Trellis IP Law Group, PC

(57) ABSTRACT

Particular embodiments generally relate to the orchestration of an order fulfillment business process using effectivity dates and versioning. In one embodiment, a plurality of services in the order fulfillment business process are provided. A definition of a business process including one or more services is received from an interface. The one or more services may be defined in steps to be performed in the order fulfillment business process. An effectivity date associated with the definition is also received from the interface. For example, the effectivity date may be associated with the business process or individual steps in the business process and may specify a period of time during which the process or step can be used. The effectivity dates and versioning may then be enforced at run-time.

17 Claims, 6 Drawing Sheets

(56) References Cited

U.S. PATENT DOCUMENTS

| | | | |
|---|---|---|---|
| 7,926,078 B2* | 4/2011 | Arsenault et al. | 725/89 |
| 7,962,424 B1* | 6/2011 | Colosso et al. | 380/201 |
| 2002/0026394 A1* | 2/2002 | Savage et al. | 705/34 |
| 2003/0140126 A1* | 7/2003 | Budhiraja et al. | 709/220 |
| 2004/0024688 A1* | 2/2004 | Bi et al. | 705/37 |
| 2004/0139176 A1* | 7/2004 | Farrell et al. | 709/220 |
| 2006/0206523 A1* | 9/2006 | Gaurav et al. | 707/104.1 |
| 2007/0016573 A1* | 1/2007 | Nanavati et al. | 707/5 |
| 2007/0255715 A1* | 11/2007 | Li et al. | 707/10 |
| 2008/0015996 A1* | 1/2008 | Notani | 705/50 |
| 2010/0070331 A1* | 3/2010 | Koegler et al. | 705/9 |
| 2011/0032898 A1* | 2/2011 | Kazmi et al. | 370/329 |

OTHER PUBLICATIONS

Oracle Application Integration Architecture for Communications 2.0: Release Note; Nov. 2007; 37 pages.

WS-BPEL Extension for Sub-processes—BPEL-SPE; A Joint White Paper by IBM and SAP; Sep. 2005; 17 pages.

Oasis "Web Services business Process Executive Language Version 2.0"; Apr. 11, 2007; 264 pages.

* cited by examiner

FIG. 4

VERSIONING AND EFFECTIVITY DATES FOR ORCHESTRATION BUSINESS PROCESS DESIGN

CROSS REFERENCES TO RELATED APPLICATIONS

This invention claims priority from U.S. Provisional Patent application Ser. No. 61/114,276 filed on Nov. 13, 2008 which is hereby incorporated by reference as if set forth in full in this application.

BACKGROUND

Particular embodiments generally relate to the orchestration of business processes.

Business enterprises need to effectively model business processes to compete in a business environment. Business processes change over time and thus the processes need to be versioned. Also, business processes are orchestrated over a long time period and it is often necessary to have multiple versions of a business process in operation at the same time. Further, a user may only want a process to be effective on certain dates.

A business analyst typically models different versions of the business process. Then, to have the different versions of the business process translated into executable processes, the business analyst has to contact an information technology (IT) designer. For example, for multiple versions of a process to be in use at the same time, the IT designer needs to be explicitly specify the version in the uniform resource identifier (URI) or partner link in the executable process. Thus, each time a new version date needs to be added, an IT designer needs to be contacted. Also, the IT designer needs to wait until a date that the business analyst wants the process to run to deploy the business process. Also, the IT designer must un-deploy the executable process when the effectivity date becomes invalid. This is inconvenient and time-consuming.

Currently, it is only possible to create business process execution language (BPEL) processes in a BPEL editor and invoke a deployed BPEL process. Because the IT designer and the business analysts have different skill sets (the business analysts are familiar with the business process being modeled and the IT designer is familiar with the orchestration language, but not the business process), the resulting BPEL process developed by the IT designer may not work as the business analyst imagined. Accordingly, there may be a wide divide between the originally-conceived business process model and the implemented model. This is further magnified when multiple versions of a business process need to be designed.

SUMMARY

Particular embodiments generally relate to the orchestration of an order fulfillment business process using effectivity dates and versioning.

In one embodiment, a plurality of services in the order fulfillment business process are provided. A definition of a business process including one or more services is received from an interface. The one or more services may be modeled in steps to be performed in the order fulfillment business process. An effectivity date associated with the definition is also received from the interface. For example, the effectivity date may be associated with the business process or individual steps in the business process and may specify a period of time during which the process or step can be used.

The definition is then stored in a run-time table, where the definition includes the effectivity date and/or a version number. During run-time, metadata for the definition is read from the run-time table. It is determined if the right version is being used. Also, it is determined if the effectivity date associated with the definition is valid. For example, if the effectivity date was associated with the process as a whole, then the effectivity date is checked to see if the business process can be executed. If not, then the business process is not executed and an error may be returned. If the effectivity date is valid for the business process, metadata for the definition may be used to create an executable process including the one or more steps. Steps in the executable process may be invoked; however, if an effectivity date is specified for a step, it is checked to see if the step should be invoked. The step is not invoked if the effectivity date is not valid.

A further understanding of the nature and the advantages of particular embodiments disclosed herein may be realized by reference of the remaining portions of the specification and the attached drawings.

BRIEF DESCRIPTION OF THE DRAWINGS

FIG. 4 shows an example of the user interface that can be used to input effectivity dates and versioning according to one embodiment.

DETAILED DESCRIPTION OF EMBODIMENTS

Particular embodiments provide for the versioning and setting of effectivity dates in the orchestration of an order fulfillment business process. An effectivity date may be a specified for a business process or process step that denotes a period of time during which that business process or process step can be used. A version may be a different instance of the same business process.

The versioning and setting of effectivity dates is important in business process administration because business requirements change and instances of business processes can be active over a relatively long period of time (e.g., weeks). Business users may want to set effectivity dates at the process or step level. Particular embodiments provide the ability for a user to set versioning or effectivity dates using an interface. This information may be stored in a data table. Metadata from the data table is then stored in a run-time table when the business process is executed. At run-time, the run-time table is read and an executable process is assembled. For example, a user may have defined a set of steps in the business process. Services for the set of steps are assembled into an executable process. The set of steps are then invoked in a series of steps according to orchestration requirements (e.g., branching and conditional rules). When the run-time table is read, effectivity dates may be checked to see if the executable process should be run. Also, if the effectivity date is specified for any step, the effectivity date is checked to see if the steps should be run. Accordingly, particular embodiments offer a run-time solution that allows effectivity dates to be set and checked at run-time. Also, the versioning of business processes may also be specified by setting versioning information using the user interface. The creation of a new version of a business process does not affect any other executable processes that are running for different versions of the business process.

Figure 5:
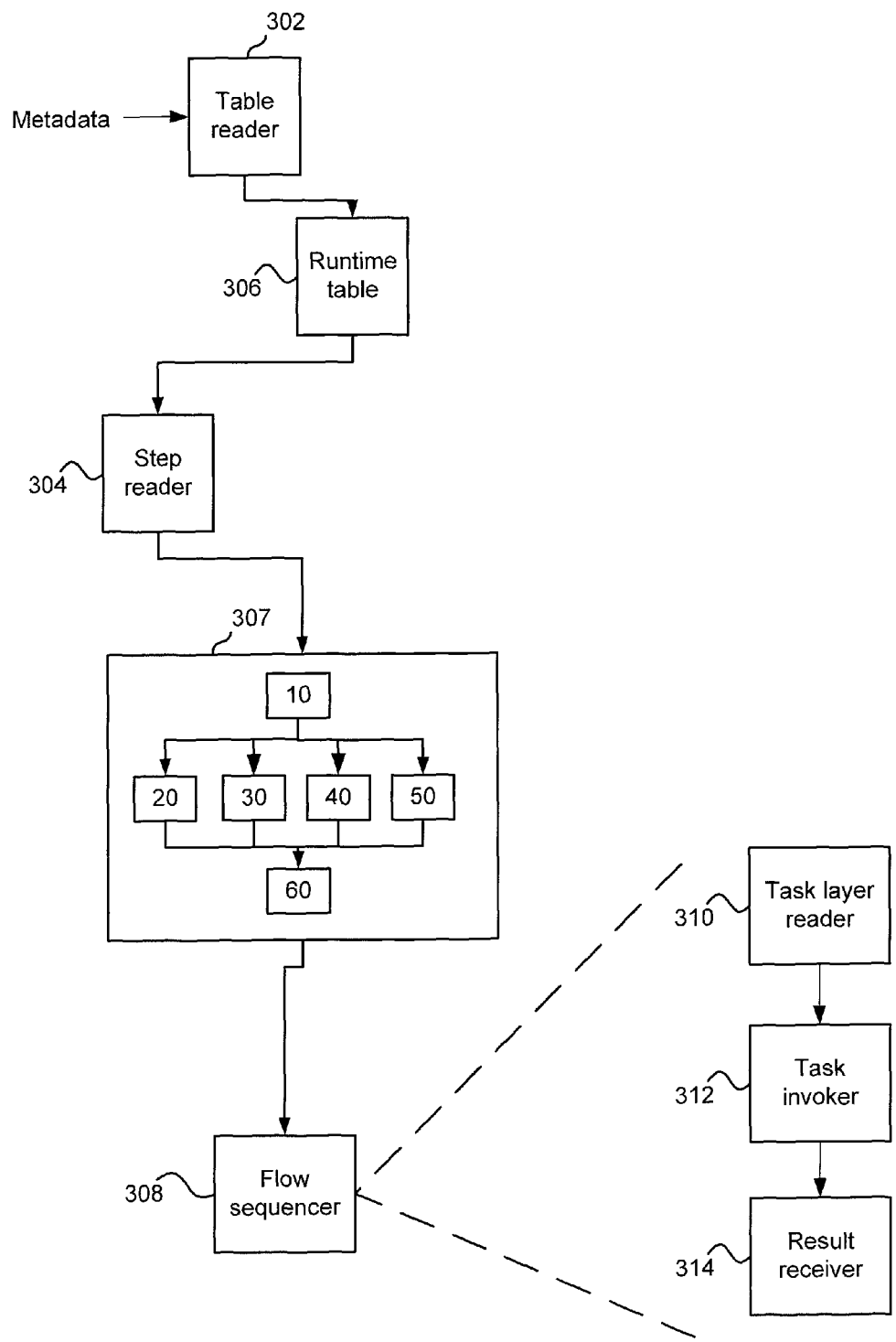
FIG. 5 describes the run-time operation according to one embodiment.

The following describes an overall system that may be used to generate and run an executable process. The effectivity dates and versioning will be described in FIG. 2. The interface that may be used to abstract the authoring of executable processes is described in FIG. 3. An interface to set effectivity dates and versioning is then described in FIG. 4. The run-time environment is described in FIG. 5 and a method to invoke services at run-time using effectivity dates and versioning is then described in FIG. 6.

System Overview

Particular embodiments provide a tool that provides a high degree of abstraction for business process modeling in an order fulfillment business process. Business processes may be modeled by users, such as business analysts, and do not need any coding from an IT designer to have the business process executed. Users are provided the flexibility to define business processes in a user interface, such as a web-based administration user interface. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process, which is assembled and executed at run-time. In one embodiment, 'run-time' can be defined as the time when an order is received for processing. Metadata is assembled in data run-time table and used to define the executable process for the business process. The metadata is used to invoke services in the executable process.

In one example, the services invoked are encapsulated and reusable. The metadata is used to determine how and when to invoke services. Also, depending on the metadata, input arguments are generated and sent to the services to invoke the service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be re-coded and redeployed. Deployment of services indicates the process is ready to be released for testing or production.

Figure 1:
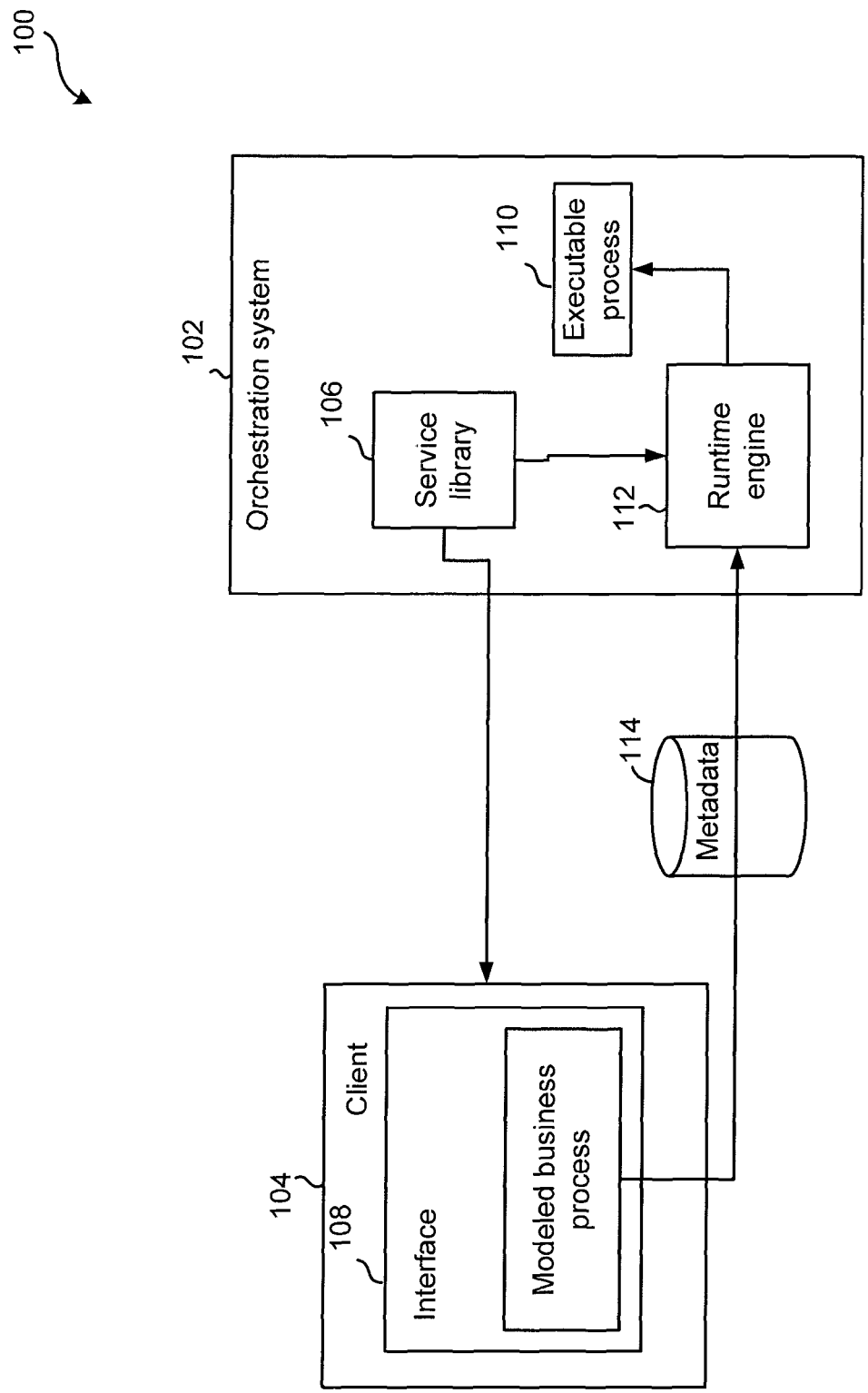
FIG. 1 depicts an example of a system for providing an orchestration process design and authoring environment according to one embodiment.

FIG. 1 depicts an example of a system 100 for providing an orchestration process design and authoring environment according to one embodiment. System 100 includes an orchestration system 102 and a client 104. Although single instances of orchestration system 102 and client 104 are provided, it will be understood that multiple instances may be used. Also, orchestration system 102 and client 104 may be part of a distributed computing system. That is, functions described may be distributed among various computing devices.

Client 104 may be a computing device or set of computing devices that are configured to allow a business process to be modeled. Orchestration system 102 orchestrates the invocation and running of services for an executable process 110 for the business process. Orchestration, as described, may be the coordination and invoking of services that need to be performed in the business process.

As used, a business process may be modeled by a user. The business process is a definition of steps to be performed. The steps are defined in interface 108. An executable process is the process that is executed by run-time engine 112. The executable process includes code that is executed to coordination performing of services.

A service library 106 that includes multiple services that can be included in a business process. In one embodiment, a service library 106 includes services that can be performed in an order fulfillment business process. Order fulfillment involves processes that are performed to fulfill an order. For example, an order may be received from an order capture system. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, particular embodiments create services for the services that are expected to be performed in an order fulfillment process.

Services can be non-configurable units and configurable units. Non-configurable units are services that are built and provided to customers. The non-configurable units are units that likely may be used in an order fulfillment process. For example, it is expected that different services may have to be performed in the order fulfillment process, such as account receivable. Accordingly, these services may be modeled using a language, such as BPEL. Although BPEL is described, it will be understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 112 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different executable processes 110. Thus, the same deployed service is used to process different input arguments for the different orders, but different results may be obtained.

In this way, the order fulfillment process can be abstracted. Different users can define which services need to be performed without regard to how the processes are coded in an orchestration language.

Interface 108 may be an administration user interface. For example, a graphical user interface allows a user to model a business process at an abstract level. For example, service library 106 may be provided to client 104. The user may then use interface 108 to define steps of the business process using services in service library 106. A user may define a plurality of steps in the business process. Each step may be associated with a service in service library 106.

The steps may be stored in a data table, which may include metadata that may be used by runtime engine 112 to orchestrate executable process 110. The data table is shown as being stored in storage 114. It will be understood that the data table may be stored in any area, such as in client 104, orchestration system 102, or any other device. The metadata may be defined by the user, determined from data tables, and/or orchestration rules. The user defines the sequence in which the services are to be invoked as well as conditional or parallel branching that may be required to effect the business processing rules. When the user selects a service for a process step, the user also provides additional metadata that is used to determine how the processing data is to be executed during the processing of an order at runtime. For example, conditional or parallel branching is defined.

At runtime, runtime engine 112 receives the metadata uses it to determine parameters for the orchestration of executable process 110. Runtime engine 112 uses the parameters to determine which steps to perform and when in executable process 110. For example, runtime engine 112 orchestrates executable process 110 by invoking services in the series of steps that have been defined by the user. As will be described in more detail below, parallel and conditional processing of steps can also be performed. Also, the metadata can be used to determine the input arguments used to invoke the services.

The metadata for the table is read at runtime and services are invoked, which allows changes to executable process 110 to be performed and realized at runtime automatically. Runtime engine 112 reads through each step that is defined and performs the steps. If a change in service is desired, the user may use interface 108 to add/delete/replace a service. At run-time, when the table is read, the change may be automatically performed. By using encapsulated services that are defined using interface 108, changes can be made to an executable process 110 and implemented at runtime. For example, alterations to the metadata during the running of the process can influence the sequence of steps taken as well as the input arguments of the individual steps.

Versioning and Effectivity Dates

Figure 2:
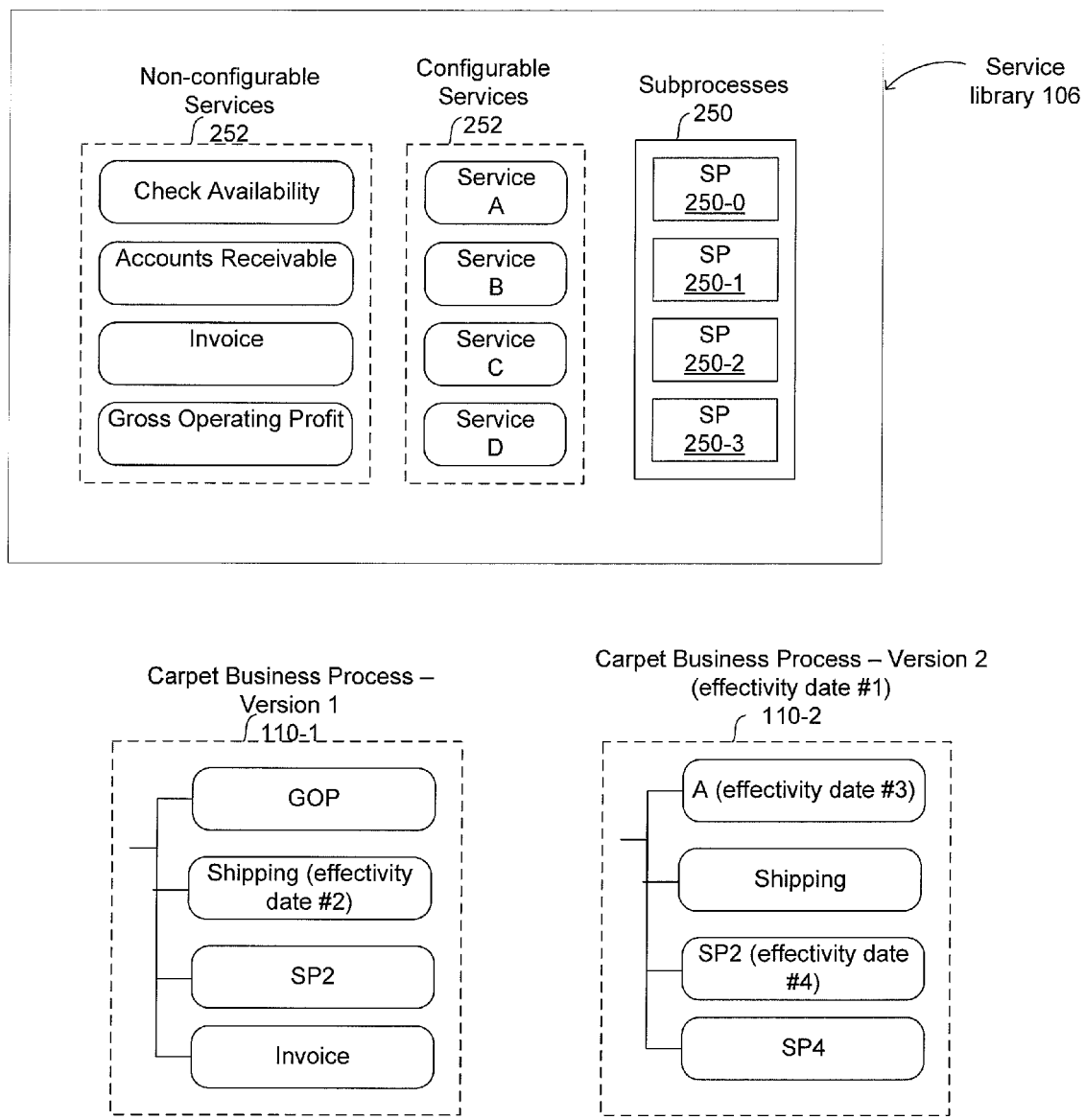
FIG. 2 shows an example of business processes that have been modeled using versioning and effectivity dates according to one embodiment.

FIG. 2 shows an example of business processes that have been modeled using versioning and effectivity dates according to one embodiment. As shown, a service library 106 includes services and sub-processes. A user may use interface 108 to select different services and sub-processes to be included in business processes. As shown, a carpet business process-version 1 and a carpet business process-version 2 have been designed by a business user. The carpet business process has two versions although any number of versions may be generated.

In carpet business process-version 1, the global order promising (GOP), shipping, sub-process 2 (SP2), and an invoice services have been included. In contrast, carpet business process-version 2 includes the service A, shipping, sub-process 2 (SP2), and sub-process 4 (SP4) services.

Versioning allows users to distinguish several business process flows that are modified. Changes to the business process flows should not affect already-running executable processes 110. For example, carpet business process-version 1 may be a running executable process 110. When version 2 is generated, it should not affect the running of version 1. Use of versioning allows version 2 to be created and run without affecting the running of version 1.

Effectivity dates may also be specified for the business processes. For example, version 2 has an effectivity date associated with it. The date may specify a start date and end date for a period of validity. Also, the effectivity date does not need to be a period but may be just a start or end date. The effectivity date is not limited to an actual date, but may be dependent on an event or other condition that can be used to determine when the executable process is valid. For example, the effectivity date may specify that the executable process is run until an event occurs. In FIG. 2, the effectivity date #1 includes a time period in which version 2 is valid. For example, a business user may only want version 2 to be used after a specific date. Also, individual steps and/or sub-processes in the business processes may have effectivity dates associated with them. For example, the shipping service step in version 1 has an effectivity date #2. In this case, version 1 may be a running process but the shipping step may only be performed during the time period specified by the effectivity date. Version 2 may also include effectivity dates #3 and #4 for other service steps.

Use of effectivity dates allow a business user to specify when a process or steps in a process should no longer be used. When an executable process becomes invalid, the process does not need to be un-deployed or removed from the processing environment because the effectivity dates are checked at run-time. If the effectivity date is not valid during run-time, the executable process will not be run. Also, business processes may be pre-deployed, that is they may be released before their planned date of use into the system. At run-time, the executable process will not be run until the effectivity date is valid. This allows flexibility and control for a business user. The versioning and effectivity dates are enforced at run-time and an IT designer does not have to configure the executable processes for the versioning and effectivity dates to be effective.

Figure 3:
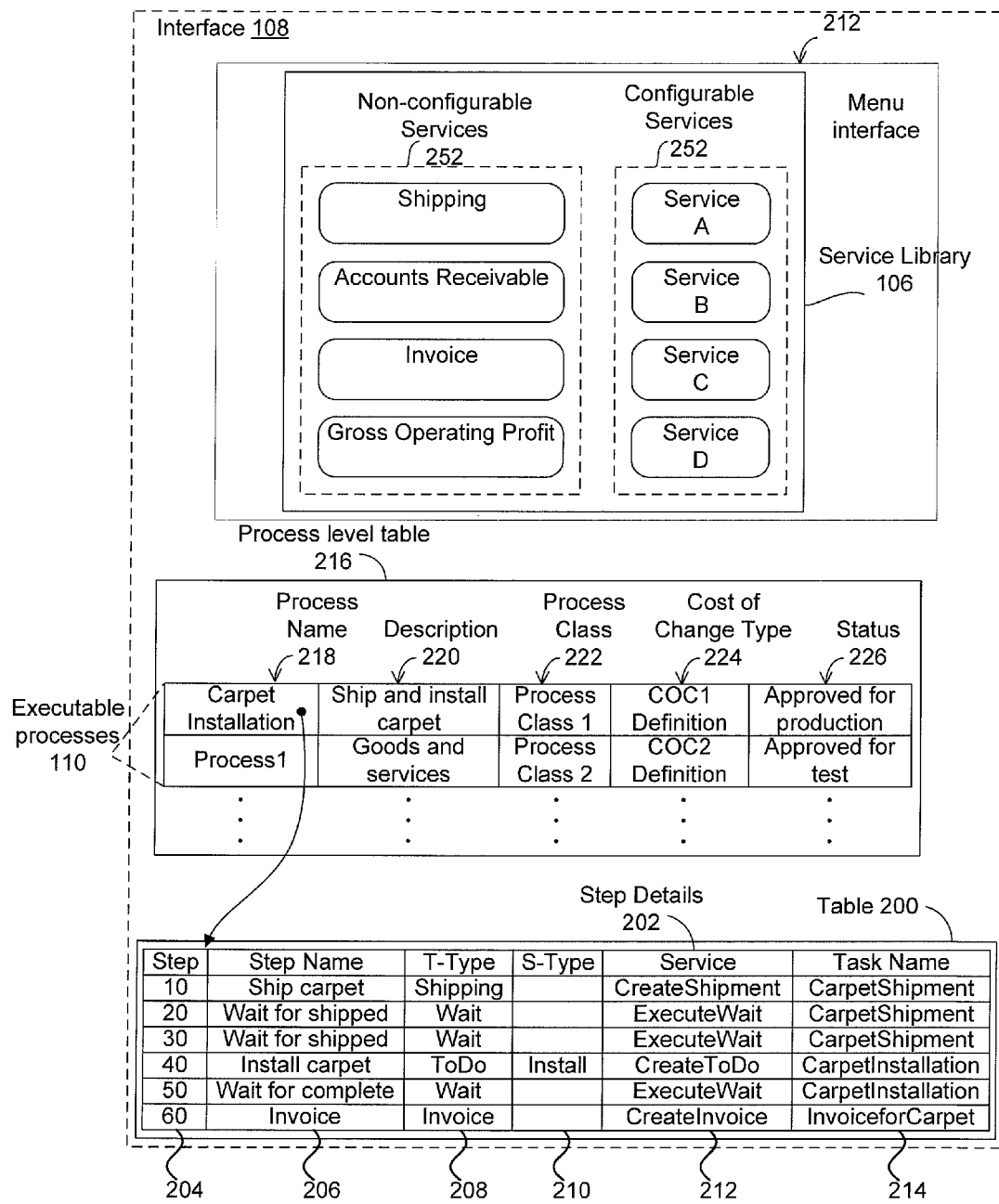
FIG. 3 depicts an example of an interface according to one embodiment.

The ability to define business processes is convenient for a user using a user interface as described in FIG. 3.

Interface

FIG. 2 depicts an example of an interface 108 according to one embodiment. Process level table 216 summarizes different business processes that have been modeled. As shown, the business processes—Carpet Installation and Process 1—have been modeled by a user.

In process level table 216, a process name column 218 shows a carpet installation business process and process 1 have been modeled. A description column 220 describes the process. A process class column 222 describes the class of the process: A status column 226 is the status of the executable process. There may be different statuses of executable processes 110. For example, some business processes may be approved for production, approved for test, or may be new. Production means that the service is approved for regular business use, approved for test is approved for testing, and new is a service in development.

A business process in table 216 can be selected and data table 200 may show the step details for individual business processes. One business process is entitled Carpet Installation and a data table 200 of step details shows each service that has been defined for the Carpet Installation.

In data table 200, a step column 204 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 108. Conditional steps are steps that depend on a result occurring (e.g., another step finishing) and parallel steps are performed in parallel. A user defines whether steps should be conditional or parallel.

Step name column 206 provides a descriptive name for the steps. For example, ship carpet, wait for shipped, install carpet, wait for complete, and invoice steps are provided.

A task type column 208 describes what type of task is being performed. For example, for the ship carpet task, an external system may perform a shipping task and for the invoice step, an invoice system may invoice for a bill.

A service column 212 identifies the service associated with the step. A task name column 214 is the name of the task. For example, theses tasks have to do with carpet and are named carpet shipment, carpet installation, and invoice for carpet. It is possible that if something other than a carpet is being installed, the task name may be different. For example, a sink shipment, sink installation, and invoice for sink may be the names of these tasks.

Users may use interface 108 to generate data table 200. A user may select services from a menu for service library 106. For example, a user uses a menu interface 212 to select services from service library 106. Drop-down menus, drag-and-drop options, and other visual processes may be used to define executable process 110. Users are provided with an orchestration-specific interface that presents the business process data with suitable validations, rather than being required to learn the complexities of a multipurpose IT development environment. This allows a user to model a business process in an abstract manner, but have executable process 110 be generated and executed from the model.

The services in service library 106 may be made up of non-configurable units and configurable units. For example, non-configurable units are provided in a column 302 and configurable units are provided in a column 304. As shown, services that are non-configurable include shipping, accounts receivable (AR), invoice, and global order promising (GOP). Also, configurable units are designated as A, B, C, and D.

Table 200 is generated as shown in interface 108 using menu 212. Table 200 is associated with metadata that describes the services to be performed and any arguments that are needed to invoke the services.

Example Interface Using Versioning and Effectivity Dates

Figure 4:
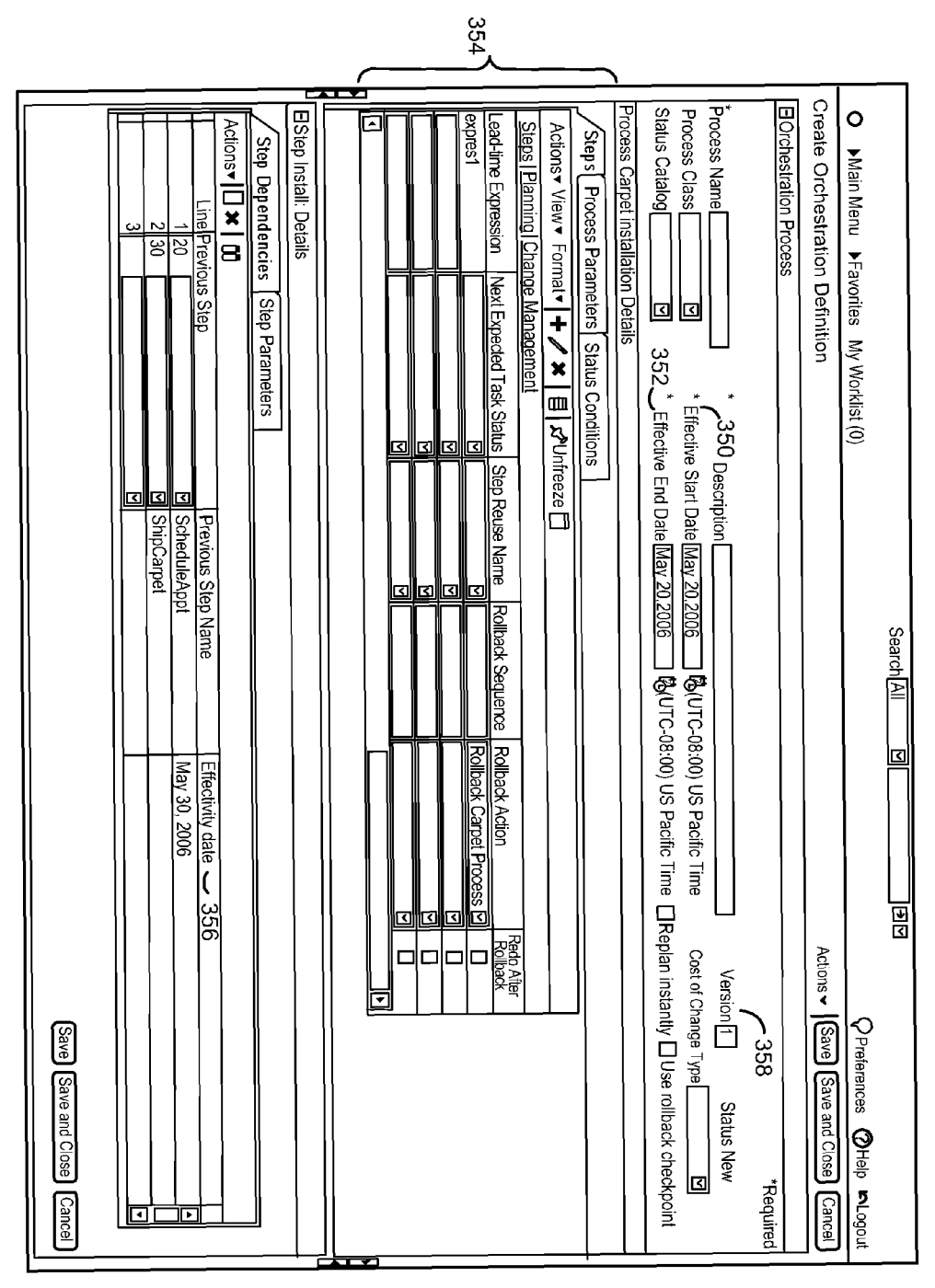

FIG. 4 shows an example of user interface 108 that can be used to input effectivity dates and versioning according to one embodiment. As shown, an effectivity start date 350 and an effectivity end date 352 may be input by user. The effectivity start and end date is for the business process carpet installation. The effectivity start date shows the date on which the business process may be valid and the effectivity end date shows the date that the business process becomes invalid.

Steps are shown in a section 354 for the process carpet installation business process. An effectivity date 356 may also be provided for each step of the business process. For example, an effectivity date has been provided for the ScheduleAppt step. It should be noted that any number of effectivity dates may be provided for the steps of the business process.

A version 358 is used to specify the version number of this business process. In this case, this is version 1. If the user wanted to create version 2, version entry box 358 would be changed to 2.

Accordingly, interface 108 provides an abstract environment to specify effectivity dates and versioning information. Information for the versioning and effectivity dates received from interface 108 may be imported to a data table 200. This information is used along with information for the steps to be invoked at run-time to create an executable process. After defining the business process using interface 108, an executable process may be generated at run-time. The services are assembled into an executable process as will be described below.

Run-Time Operation

Once the business process is modeled in interface 108 and released by setting the process status, runtime engine 112 is used to orchestrate the invocation of the services. FIG. 3 describes the runtime operation according to one embodiment. A table reader 302 receives metadata from interface 108 defining the business process. Table reader 302 may copy the data to a runtime table 306 but this is not necessary.

During run-time, a step reader 304 is configured to read the steps in runtime table 306. Step reader 304 may analyze the metadata and determine which steps should be executed and when. For example, step reader 304 checks to see if parallel or conditional branching is associated with a step. The metadata is also used to determine input arguments for the services. The input arguments may be determined from the metadata, from data in lookup tables, or determined using rules.

Step reader 304 may assemble executable process 110 using encapsulated services from service 106 and the metadata. For example, code for each service that was modeled in the steps is determined for executable process 110. The input arguments for each service are also determined. For example, the metadata is used to determine the input arguments such that the services can process an order for the business process. Also, any partner links are determined using the metadata to allow the services to interact with external systems. Executable process 110 is assembled based on the definition of steps in the business process. Because services are re-usable, the same code for a service can be used for different business processes. However, the input arguments or partner links may be different. Because the same code is re-used, automatic assembly of executable process 110 is provided.

Also, the effectivity dates and versioning information may be stored as metadata in run-time table 304. When an executable process is assembled, the effectivity dates may be checked. If the effectivity date for the executable process is invalid, then an error may be returned to the user. If the effectivity date is valid, then running of the executable process may proceed. If the effectivity dates are set for process steps as well, only those process steps with effectivity dates are run. Also, the version information is used to make sure the correct version of an executable process is being run. Services are assembled into an executable process 110 as shown in 307. As shown in 307, a step 10 may be performed and then steps 20, 30, 40, and 50 are performed in parallel. When these steps have been performed, a step 60 is performed.

The versioning may be associated with an executable process without having associated partner links or an URI configured in a command. Conventionally, the version needs to be specified in the partner links or URI for the process. This requires an IT designer to code and configure the executable process for each version. However, particular embodiments assemble the executable process at run-time and do not need to include the version in the URI or partner link. In one embodiment, run-time engine 112 takes the latest released version of business process unless there is configured business logic dictating the use of a prior version.

A flow sequencer 308 is used to dynamically invoke the steps at the appropriate time based on executable process 110. As shown, a step 10 may be performed and then steps 20, 30, 40, and 50 are performed in parallel. When these steps have been performed, a step 60 is performed. Flow sequencer 308 may determine relevant input arguments depending on the content of the metadata received. These input arguments are then used to invoke a service. For example, flow sequencer 308 may include a task layer reader 310 that determines a service to invoke. A task invoker 312 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 314. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 308 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 108.

Accordingly, a user can set up the steps in a business process. Executable process 110 can be automatically assembled at run-time. The code used in executable process 110 is not generated by the user who set up the business process. Rather, metadata can be defined and is used to assemble encapsulated services for executable process 110.

Figure 6:
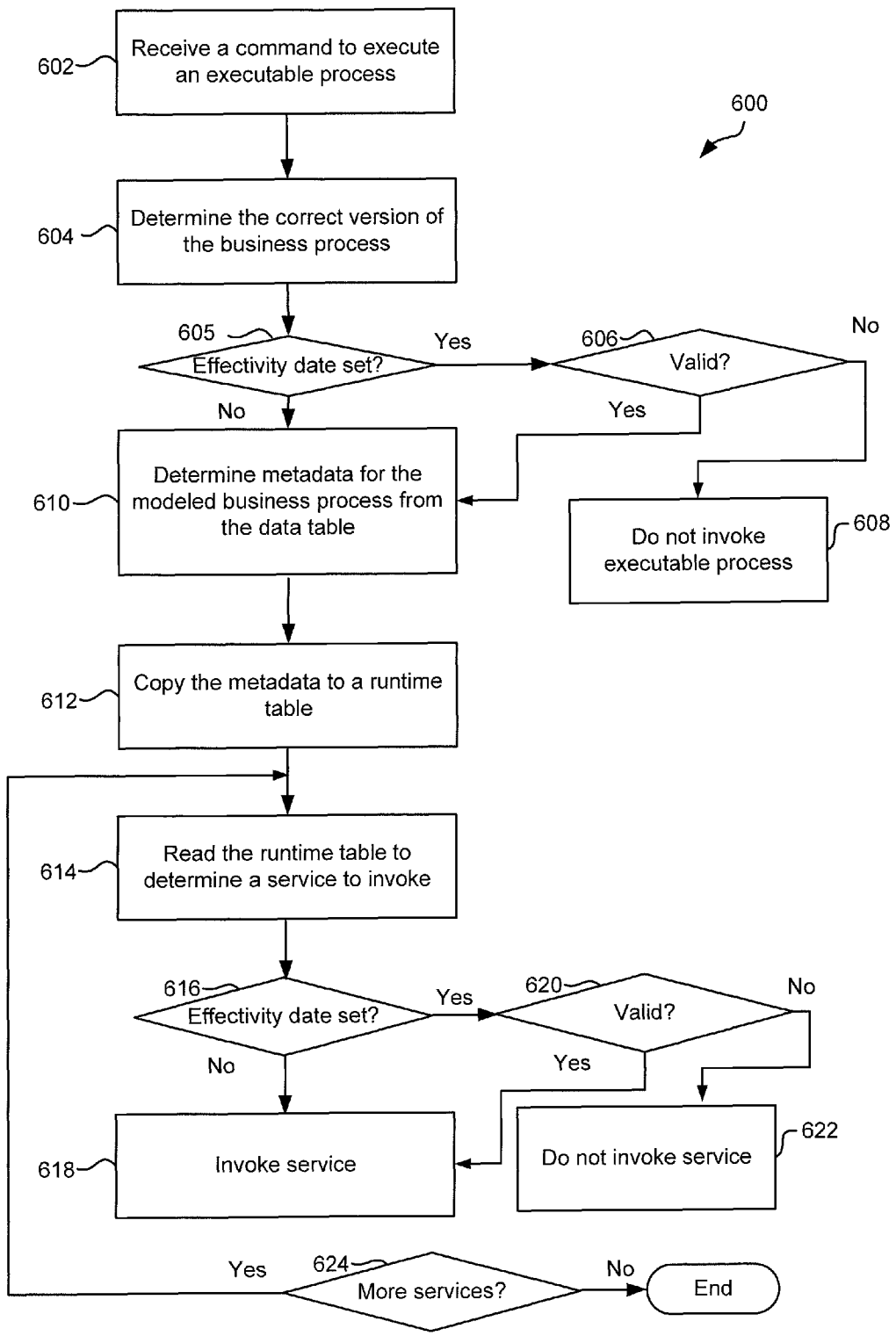
FIG. 6 depicts a simplified flowchart of a method for checking effectivity dates and versioning information according to one embodiment.

FIG. 6 depicts a simplified flowchart of a method for checking effectivity dates and versioning information according to one embodiment. Step 602 receives a command to execute an executable process. The command may include versioning information for a business process.

Step 604 determines the correct version of the business process. For example, a data table for the business process that was modeled using interface 108 for the correct version is determined. Step 605 determines if an effectivity date for the process is set and valid If an effectivity date is set, it is determined if the effectivity date is valid in step 606. If the effectivity data is set and not valid or is not set, the process is not copied to the runtime table and the executable process is not performed in step 608. If the effectivity date is valid, then the service is copied to the runtime table and invoked in step 610. A valid effectivity date may be a "from" date (i.e., a start date). An end date may or may not be required. Step 610 determines metadata for the modeled business process from the data table. Step 612 copies the metadata to a run-time table. For example, the metadata is used to assemble an executable process and to invoke services.

Step 614 then reads the run-time table to determine a service to invoke. Step 616 determines if an effectivity date for the service is set. If an effectivity date was not set, then the service is invoked in step 618. If an effectivity date is set, step 620 determines if the effectivity date is valid. If not, the service is not invoked in step 622. If the effectivity date is valid, then the service is invoked in step 618.

Step 624 determines if there are more services to perform. If so, the process reiterates to determine another service to invoke in step 610. If not, the process ends.

CONCLUSION

Conventionally, in a BPEL process, different versions could have been created and deployed by an IT designer. However, this required an IT designer to deploy the process. Particular embodiments do not need a process to be deployed to set a version and/or effectivity date. Particular embodiments allow an abstract modeling of a business process that provides the ability to define versions and their effectivity dates. At run-time, the version and effectivity dates are read and used in the assembly and execution of an executable process. The different versions do not need to be deployed. This allows users to modify business processes without affecting versions that are running and also allows the pre-deployment of business processes using effectivity dates.

Providing versioning and effectivity dates using an abstract modeling environment allows users to create business processes without the involvement of an IT designer. Multiple versions of a process may be deployed and the availability of versions may be restricted using effectivity dates. The user needs to set up the sequence of operations on a data table and include version and effectivity date specifications. This information is read at run-time and used to assemble and execute an executable process. By not requiring pre-deployment of different versions prior to run-time, the lifecycle of modeling a business process and having it executed is shortened.

Further description of a distributed order orchestration system is described in U.S. patent application Ser. No. 12/617,698, entitled "DISTRIBUTED ORDER ORCHESTRATION" (ORACP0023), filed concurrently and incorporated by reference for all purposes. Also, further details on orchestration are described U.S. patent application Ser. No. 12/617,695, entitled "DATA DRIVEN ORCHESTRATION OF BUSINESS PROCESSES" (ORACP0002) and U.S. patent application Ser. No. 12/617,696, entitled "REUSABLE BUSINESS SUB-PROCESSES AND RUN-TIME ASSEMBLY" (ORACP0005), all of which are filed concurrently with this application and all of which are incorporated by reference for all purposes.

Although the description has been described with respect to particular embodiments thereof, these particular embodiments are merely illustrative, and not restrictive. Although BPEL is described, it will be understood that other languages may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed using a computer networked with at least one client, an interface to a business process modeling editor distributed between the computer and the client, and a non-transitory computer readable storage medium in data communication with the computer, the client, and the interface, for orchestrating one or more business processes, the method comprising:
    rendering a client orchestration-specific interface receiving input via the client orchestration-specific interface to abstractly model and assemble executable business processes wherein the client-orchestration specific interface in response to the input define[s], assemble[s], and orchestrate[s] the executable business processes and one or more services used to effectuate the executable business processes generated in orchestration language code;
    receiving from the client orchestration specific interface selection of one or more a common signature[s] used to invoke the one or more services, wherein the common signature defines a data structure for reuse of the one or more services in a plurality of different business processes, and wherein the one or more services include configurable services and non-configurable services code;
    storing, identifiers of the one or more services associated with multiple sources, selected through the client orchestration-specific interface, into a run-time table on the non- transitory computer readable storage medium to define a sequence of steps of a specified version of a first business process modeled, in part, separately on the client;
    assigning, using the computer and in response to the input from the client orchestration-specific interface, a specified version identifier to the specified version of the first business process to distinguish the specified version of the first business process from other versions of the business process;
    assigning, using the computer and in response to the input from the client orchestration-specific interface, a first effectivity date to a first selected one of the services of the specified version of the first business process to indicate a time period when the first selected one of the services of the specified version of the first business process is valid;
    assigning, using the computer and in response to use the input from the client orchestration-specific interface, a second effectivity date to a second selected one of the services of the specified version of the first business process to indicate a time period when the second selected one of the services of the specified version of the first business process is valid;
    storing the specified version identifier and the first and second effectivity dates into the run-time table on the non-transitory computer readable storage medium;
    reading, at run-time and using the computer metadata from a run-time table, based on the selected common signature and automatically assemble the sequence of steps and first effectivity date and second effectivity date of the specified version of the first business process, and additional process changes received at run-time;
    determining whether the first effectivity date is valid;
    determining which of the one or more services have invalid effectivity dates:
    assembling multiple services in the specified version of the first business process except for services having an invalid effectivity date into the executable process at run-time only if the first effectivity date is valid; and
    modifying the executable process at run-time based on the additional process changes and running valid business process without re-deployment of the executable process;
    wherein running the executable process assembled from all services in the specified version of the first business process does not affect the running of an executable process assembled from another version of the first business process assigned a different version identifier.

2. The method of claim 1 where the effectivity date is a start date or an end date.

3. The method of claim 1 further comprising:
assigning a same effectivity date to all steps in the sequence of steps.

4. The method of claim 1 further comprising:
assigning different effectivity dates to all steps in the sequence of steps.

5. The method of claim 1 further comprising:
assigning effectivity dates to a subset of the steps in the sequence of steps.

6. The method of claim 1 wherein the effectivity date is dependent on an event or other condition that determines when the specified version of the first business process is valid.

7. The method of claim 1 further comprising configuring the one or more services to receive and process different input arguments formatted in accordance with the common signatures and produce different outputs relative to each of the different input arguments.

8. The method of claim 1 further comprising:
determining based on predefined effectivity dates and predefined versions associated with the one or more business processes, which of the one or more business processes are deployable prior to a planned date of use;
deploying at least one business process of the one or more business processes determined deployable prior to the planned date of use; and
at run-time, in response to both the predefined effectivity dates and the predefined versions associated with the at least one business process, assembling and executing one or more executable processes of the at least one business process deployed using the orchestration language code.

9. The method of claim 1 wherein the client orchestration-specific interface comprises a web-based user interface configured to visually model behavior of the executable business processes based on the user input using the orchestration language code to specify both executable processes and abstract processes.

10. The method of claim 9 wherein the orchestration language code comprises a business process execution language (BPEL).

11. A non-transitory computer readable storage medium comprising encoded logic for execution by one or more processors and when executed operable to orchestrate an order fulfillment business process, the logic operable to;
rendering a client orchestration-specific interface receiving input via the client orchestration-specific interface to abstractly model and assemble executable business processes wherein the client-orchestration-specific interface in response to the input define[s], assemble[s], and orchestrate[s] the executable business processes and one or more services used to effectuate the executable business processes generated in orchestration language code;
receiving from the client orchestration specific interface selection of one or more a common signature[s] used to invoke the one or more services, wherein the common signature defines a data structure for reuse of the one or more services in a plurality of different business processes, and wherein the one or more services include configurable services and non-configurable services code;
storing, identifiers of the one or more services associated with multiple sources, selected through the client orchestration-specific interface, into a run-time table on the non-transitory computer readable storage medium to define a sequence of steps of a specified version of a first business process modeled, in part, separately on the client;
assigning, using the computer and in response to the input from the client orchestration-specific interface, a specified version identifier to the specified version of the first business process to distinguish the specified version of the first business process from other versions of the business process;
assigning, using the computer and in response to the input from the client orchestration-specific interface, a first effectivity date to a first selected one of the services of the specified version of the first business process to indicate a time period when the first selected one of the services of the specified version of the first business process is valid;
assigning, using the computer and in response to use the input from the client orchestration-specific interface, a second effectivity date to a second selected one of the services of the specified version of the first business process to indicate a time period when the second selected one of the services of the specified version of the first business process is valid;
storing the specified version identifier and the first and second effectivity dates into the run-time table on the non-transitory computer readable storage medium;
reading, at run-time and using the computer metadata from a run-time table, based on the selected common signature and automatically assemble the sequence of steps and first effectivity date and second effectivity date of the specified version of the first business process, and additional process changes received at run-time;
determining whether the first effectivity date is valid;
determining which of the one or more services have invalid effectivity dates:
assembling multiple services in the specified version of the first business process except for services having an invalid effectivity date into the executable process at run-time only if the first effectivity date is valid; and
modifying the executable process at run-time based on the additional process changes and running valid business process without re-deployment of the executable process.

12. The computer readable storage medium of claim 11 wherein the logic is operable to determine if the first effectivity date for the specified version of the first business process is valid and to dynamically invoke only valid services based on a determined orchestration sequence.

13. The non-transitory computer readable storage medium of claim 11 wherein each of the steps has an effectivity date associated therewith, with the effectivity date for each of the steps being the same.

14. The non-transitory computer readable storage medium of claim 11 wherein each of the steps has an effectivity date associated therewith, with the effectivity date for each of the steps being different from the effectivity date associated with remaining steps.

15. The non-transitory computer readable storage medium of claim 11 wherein the effectivity date comprises a period of time in which the specified version of the first business process is valid.

16. The non-transitory computer readable storage medium of claim 11 wherein a subset of the steps have the effectivity date assigned thereto.

17. An apparatus configured to orchestrate one or more business processes, the apparatus comprising:

one or more processors; a display; and logic encoded in one or more non-transitory tangible computer readable media for execution by the one or more processors and when executed operable to:

rendering a client orchestration-specific interface receiving input via the client orchestration-specific interface to abstractly model and assemble executable business processes wherein the client-orchestration-specific interface in response to the input define[s], assemble[s], and orchestrate[s] the executable business processes and one or more services used to effectuate the executable business processes generated in orchestration language code;

receiving from the client orchestration specific interface selection of one or more a common signature[s] used to invoke the one or more services, wherein the common signature defines a data structure for reuse of the one or more services in a plurality of different business processes, and wherein the one or more services include configurable services and non-configurable services code;

storing, identifiers of the one or more services associated with multiple sources, selected through the client orchestration-specific interface, into a run-time table on the non-transitory computer readable storage medium to define a sequence of steps of a specified version of a first business process modeled, in part, separately on the client;

assigning, using the computer and in response to the input from the client orchestration-specific interface, a specified version identifier to the specified version of the first business process to distinguish the specified version of the first business process from other versions of the business process;

assigning, using the computer and in response to the input from the client orchestration-specific interface, a first effectivity date to a first selected one of the services of the specified version of the first business process to indicate a time period when the first selected one of the services of the specified version of the first business process is valid;

assigning, using the computer and in response to use the input from the client orchestration-specific interface, a second effectivity date to a second selected one of the services of the specified version of the first business process to indicate a time period when the second selected one of the services of the specified version of the first business process is valid;

storing the specified version identifier and the first and second effectivity dates into the run-time table on the non-transitory computer readable storage medium;

reading, at run-time and using the computer metadata from a run-time table, based on the selected common signature and automatically assemble the sequence of steps and first effectivity date and second effectivity date of the specified version of the first business process, and additional process changes received at run-time;

determining whether the first effectivity date is valid;

determining which of the one or more services have invalid effectivity dates:

assembling multiple services in the specified version of the first business process except for services having an invalid effectivity date into the executable process at run- time only if the first effectivity date is valid; and modifying the executable process at run-time based on the additional process changes and running valid business process without re-deployment of the executable process.

* * * * *

UNITED STATES PATENT AND TRADEMARK OFFICE
CERTIFICATE OF CORRECTION

PATENT NO. : 9,466,037 B2
APPLICATION NO. : 12/617697
DATED : October 11, 2016
INVENTOR(S) : Reed et al.

It is certified that error appears in the above-identified patent and that said Letters Patent is hereby corrected as shown below:

In Column 7, Line 21, delete "theses" and insert -- these --, therefor.

In Column 13, Line 46, in Claim 11, delete ";" and insert -- : --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*